US007159939B2

(12) United States Patent
Brown et al.

(10) Patent No.: US 7,159,939 B2
(45) Date of Patent: Jan. 9, 2007

(54) BEDDED VEHICLE SEATING ACCESSORY

(76) Inventors: John J. Brown, 46 Grove St., Peterborough, NH (US) 03458; Randall Henexson, Jr., 512 Star Light Dr., Waco, TX (US) 76705

( * ) Notice: Subject to any disclaimer, the term of this patent is extended or adjusted under 35 U.S.C. 154(b) by 0 days.

(21) Appl. No.: 10/768,516

(22) Filed: Jan. 30, 2004

(65) Prior Publication Data

US 2005/0168022 A1 Aug. 4, 2005

(51) Int. Cl.
*A47C 13/00* (2006.01)

(52) U.S. Cl. .................. 297/217.7; 297/248; 297/130; 296/64

(58) Field of Classification Search ................ 297/232, 297/243, 248, 463.1, 452.18, 217.7, 130; 296/63, 64, 65.03
See application file for complete search history.

(56) References Cited

U.S. PATENT DOCUMENTS 825,641 A * 7/1906 Ebrenz ........................ 296/63
3,747,979 A * 7/1973 Barecki ................... 297/451.1
3,944,283 A * 3/1976 Molzon ................. 297/452.39
4,447,087 A * 5/1984 Massonnet .............. 297/130 X
4,623,187 A * 11/1986 Ibrahim ...................... 297/243
5,139,301 A * 8/1992 Lewis ......................... 296/63
5,368,354 A * 11/1994 Martin ........................ 296/64
5,398,985 A * 3/1995 Robinson ..................... 296/10
5,516,179 A * 5/1996 Tidwell ....................... 296/63
6,142,572 A * 11/2000 Allen ...................... 297/445.1
6,651,469 B1 * 11/2003 Arias .......................... 70/261

* cited by examiner

*Primary Examiner*—Anthony D. Barfield
(74) *Attorney, Agent, or Firm*—Marcus W. Hammack

(57) ABSTRACT

An auxiliary seating unit is designed for a vehicle with a bed, such as a bed-type all terrain vehicle or pickup truck. The seating unit is designed with seats mounted to a support frame, the support frame having portions which rest squarely atop the vehicle's bed surface, white upper portions of the frame juxtapose and reversibly attach (using pins and cotter keys, nuts and bolts, or other reversible attachment means) to the upper margins of the vehicle's bed fence. Seats are securely attached to and supported by seat supports which extend from the portions of the support frame which attach to the vehicle.

1 Claim, 5 Drawing Sheets

12
26
22
34
20
10
22
26
22
18
16

10
34
26
22
12
12
32
28

BEDDED VEHICLE SEATING ACCESSORY

BACKGROUND OF THE INVENTION

1. Field of the Invention

The present invention relates to vehicle accessories.

2. Background Information

All terrain vehicles ("ATVs") are very popular in numerous environments. The "GATOR" by John Deere is an example which can be seen in both utilitarian and recreational use, ranging from grounds keepers on college campuses, to hunters moving in back woods areas. They are useful for sightseeing in rough outback areas, and are useful for moving people and small equipment around farms and ranches. The GATOR ATV is typical of a number of ATVs, having two seats and a pickup truck like bed behind the seats.

A problem has surfaced with respect to these two seats+bed configured ATVs—transporting more than two individuals is impractical at best, but also dangerous, especially when moving about rough terrain. Having people sit or lie in the bed of an ATV, such as the GATOR brand ATV, without actual seating invites injury. There is nothing substantial to which a passenger can hold to stabilize ones self. Also, comfort is simply a non-issue—it cannot be achieved.

Some have proposed (and tried) solutions to this situation. These proposed solutions include welding bench-like seating in the ATV bed, welding or bolting seats to the bed, adding seatbelt-like straps for at least providing hand-holds, and lashing lawn chair(s) in place. None of these options provide a sufficiently seating platform provide a realistic (and safe) additional seating option for this type of ATV. Nothing better than these inadequate attempts has surfaced, despite numerous requests by owners of such ATVs, and even by a number of ATV dealers known to the present inventors for a workable auxiliary seating option.

It would well serve owners and dealers of bed-type ATVs (and, in some cases, even pickup trucks) to provide some means by which one or more seats could be added to the bed area, and which seats would be stable, comfortable, and attractive. Even better would be such an accessory which would be readily added or removed, depending on the need for the auxiliary seating.

SUMMARY OF THE INVENTION

In view of the foregoing, it is an object of the present invention to provide auxiliary seating for a bed-type all terrain vehicle.

It is another object of the present invention to provide an auxiliary seating device for attachment to a bed-type all terrain vehicle.

It is another object of the present invention to provide an auxiliary seating device for reversible attachment to a bed-type all terrain vehicle.

In satisfaction of these and related objects, the present invention is of a removable auxiliary seating module which is easily secured and removed from the bed of a bed-type ATV, provides two extra seats, and in its preferred embodiment (through use of seats which at least resemble those of the original two seats) appear to be original equipment. Because of a combination of support and attachment features, the seating module of the present invention is, when installed, as stable and apparently permanent as any original fixture of the vehicle.

DETAILED DESCRIPTION OF THE PREFERRED EMBODIMENT

Figure 1:
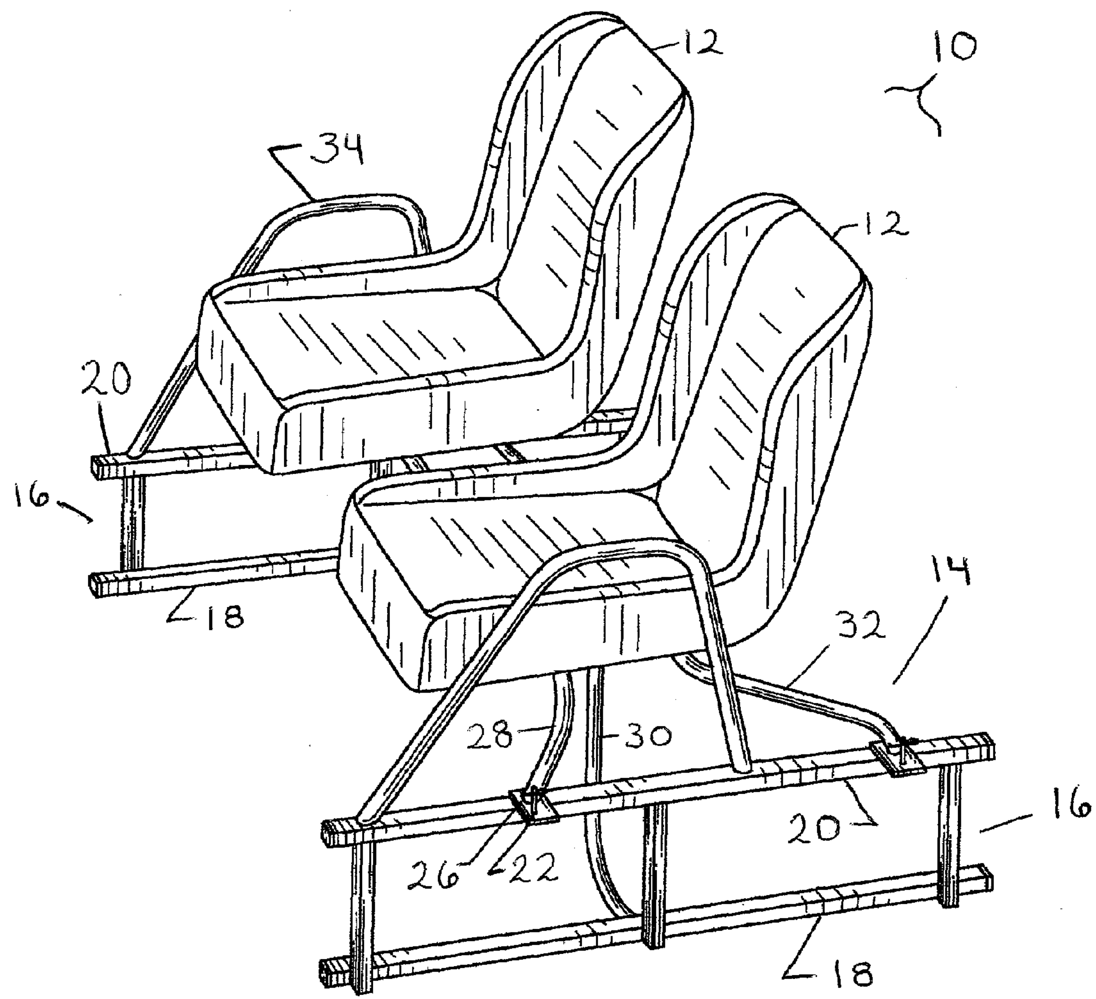
FIG. 1 is a perspective view of the preferred embodiment for an ATV auxiliary seating unit of the present invention.
Figures 2, 3:
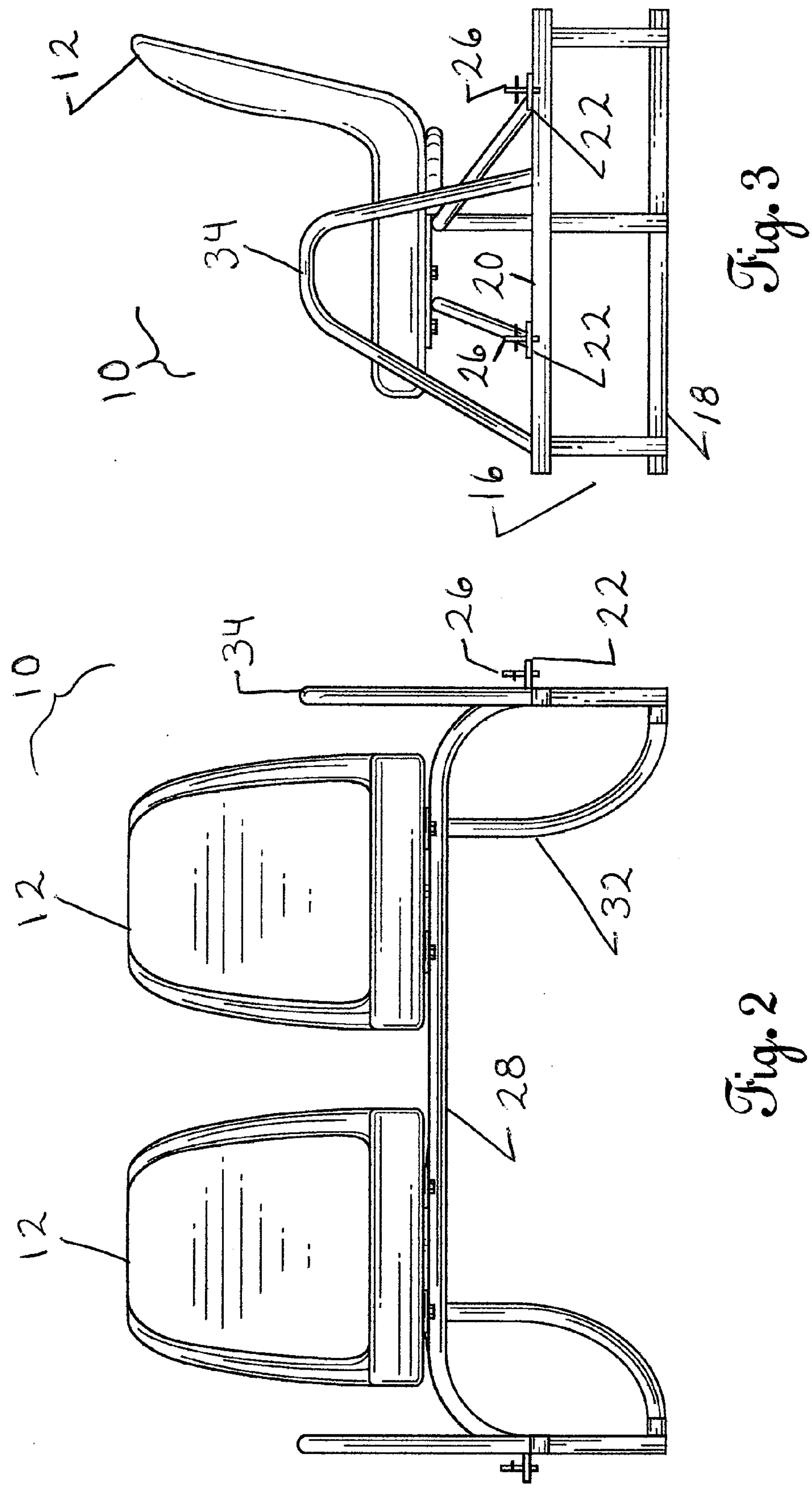
FIG. 2 is a from elevational view of the preferred embodiment of the present invention.
FIG. 3 is a left side elevational view of the preferred embodiment.
Figure 5:
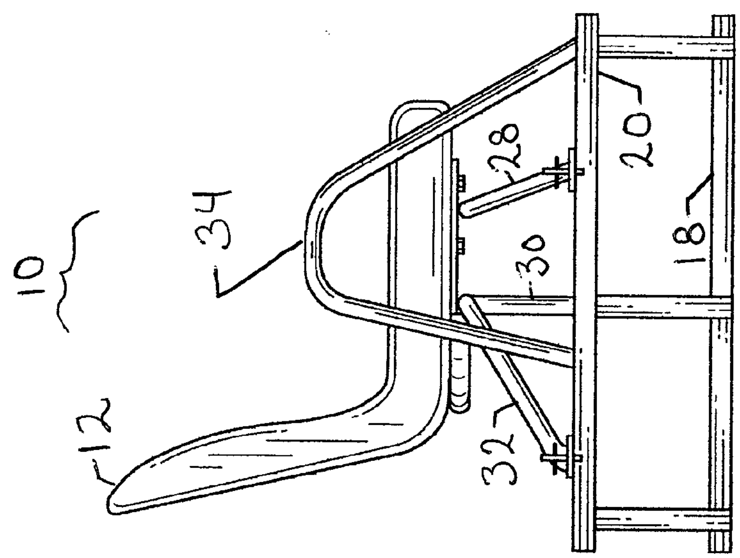
FIG. 5 is a right side elevational view of the preferred embodiment of the present invention.
Figure 4:
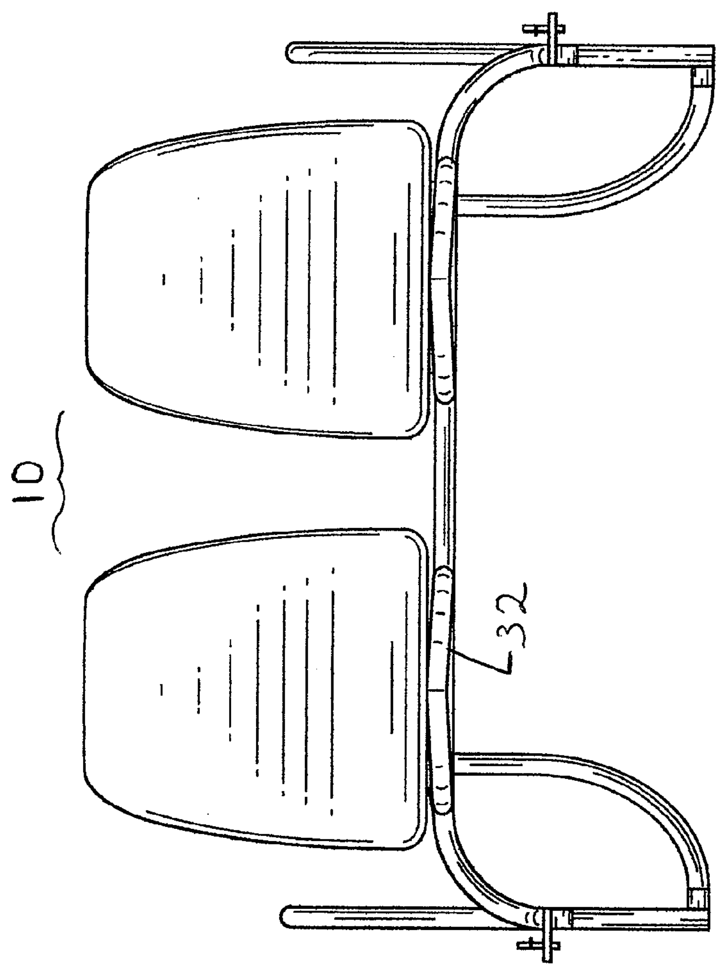
FIG. 4 is a rear elevational view of the preferred embodiment of the present invention.
Figure 6:
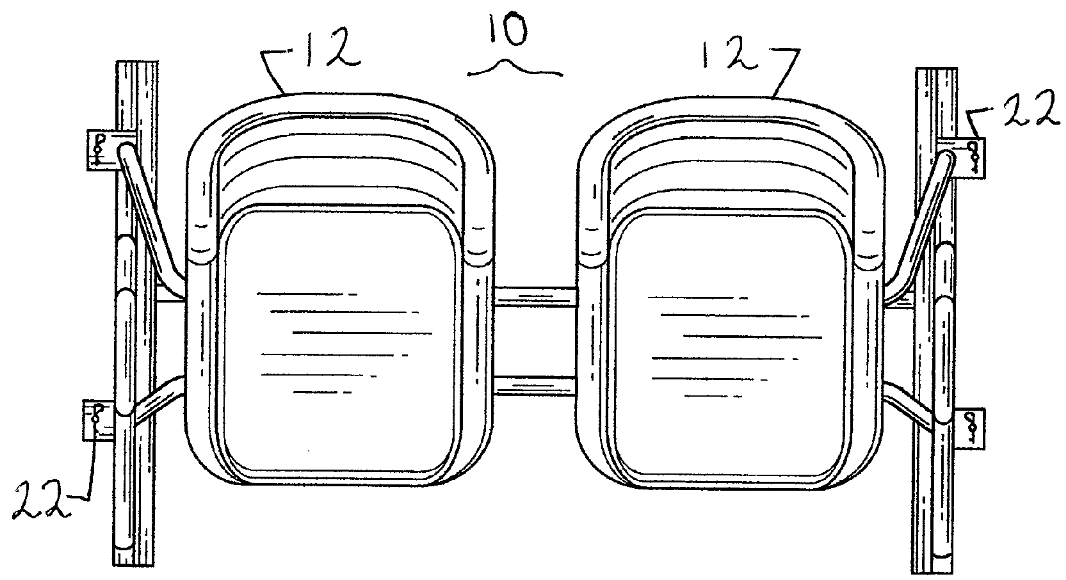
FIG. 6 is a top plan view of the preferred embodiment of the present invention.
Figure 7:
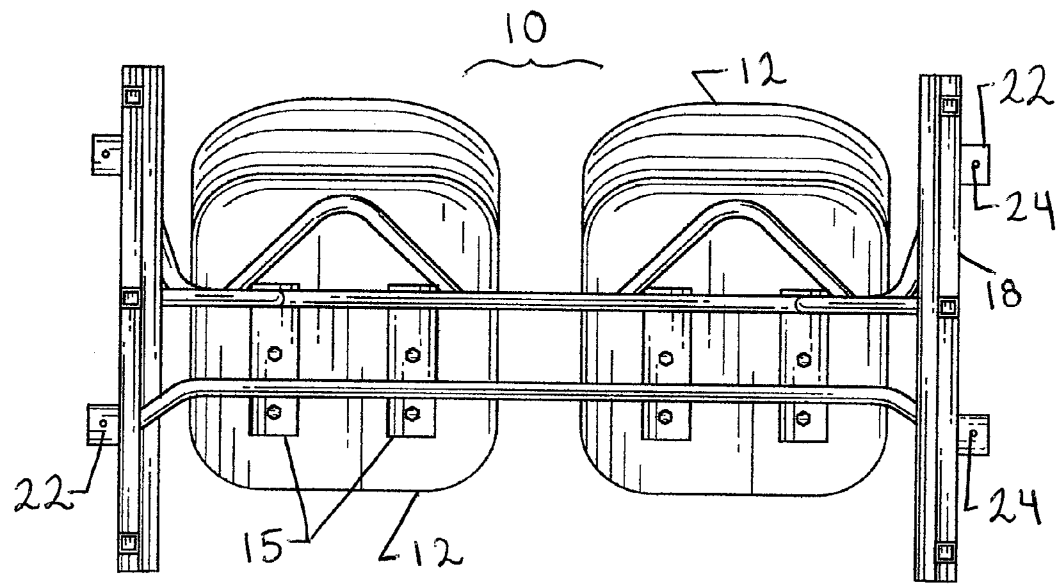
FIG. 7 is a bottom plan view of the preferred embodiment of the present invention.
Figure 8:
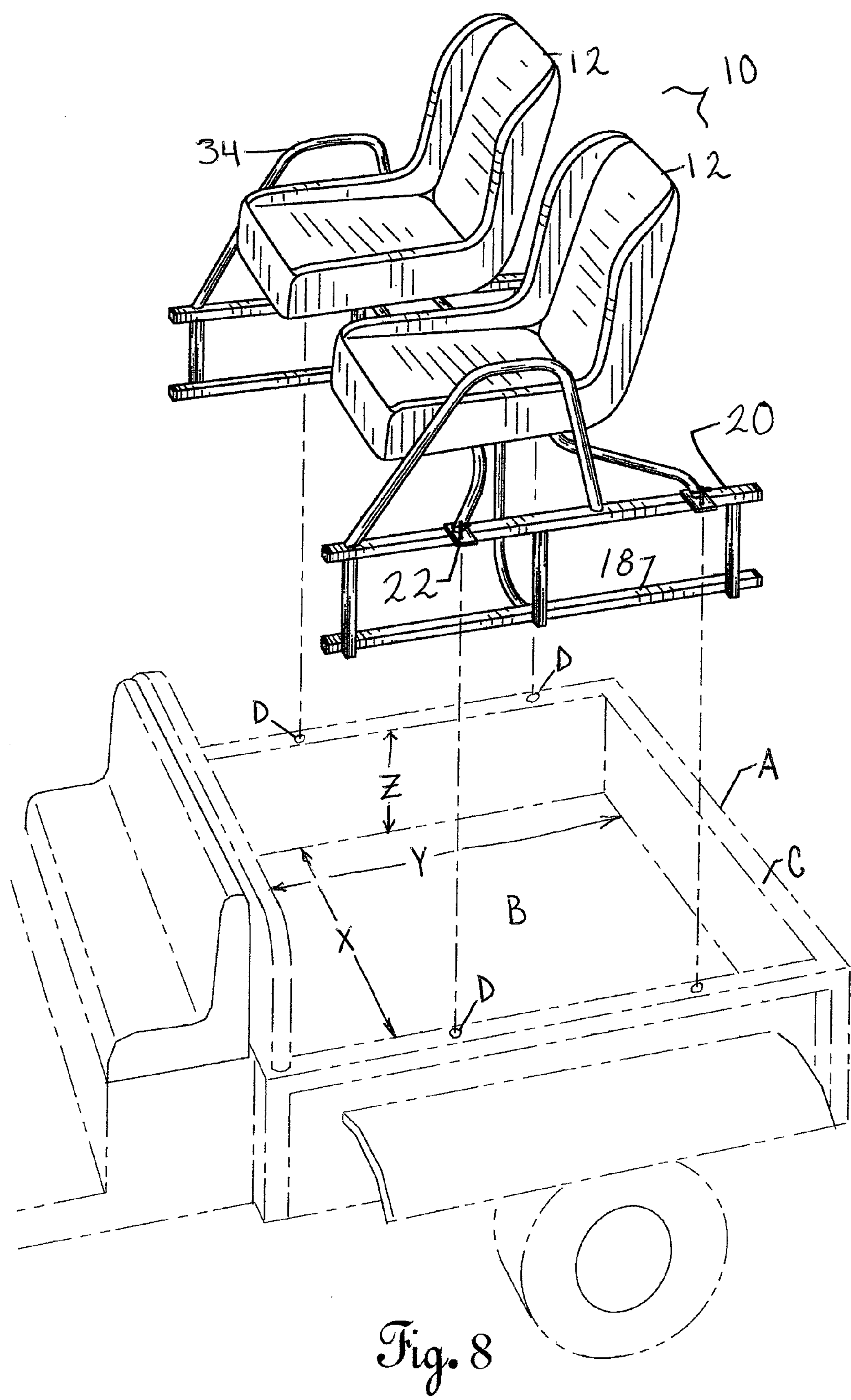
FIG. 8 is an exploded perspective view of the seating module of the present invention, shown in relation to the bed of a bed-type ATV in which it is designed to be installed.

Referring to FIGS. 1–8, the seating module of the present invention is identified generally by the reference number 10.

Seating module 10 includes, in the preferred embodiment, two seats 12. Seats 12 are, in the preferred embodiment, selected to at least mimic the original equipment seats of the ATV (not shown in the drawings). In the case of the John Deere GATOR brand ATV, for example, seats 12 will ideally be "John Deere yellow" original equipment seats obtained direction from the manufacturer.

Seats 12 are supported by a support frame 14, and are attached to seat brackets 15 using suitable nuts and bolts, for example. In addition to those portions of support frame 14 on which seats 12 rest, and to which they are securely attached, support frame 14 includes two vehicle engagement panels 16, one on either side of seating module 10.

Vehicle engagement panels 16 are specifically designed whereby, when seating module 10 is installed in an ATV (or other bed-type vehicle), a lower engagement panel frame rail 18 rests on the horizontal bed surface B of the ATV A, closely adjacent bed fence C (see FIG. 8), while an upper engagement panel rail 20 resides adjacent and substantially parallel to the upper perimeter D of bed fence C. Attachment plates 22 are positioned to overlie holes D in the ATV bed fence C, with holes 24 in the attachment plates 22 positioned for respectively lining up with the holes D formed in the bed fence. Pins 26 are provided for extending through holes 22 and D for securing seating module 10 in place.

While not shown in detail in the drawings, each pin 26 includes a head which rests securely against the upper surface of a respective attachment plate 22, and has, at its distal end, holes for receiving cotter keys (not separately shown) for securing pins 26 against accidental dislodgment. Of course, alternatives (such as nuts and bolts) may be substituted for pins 26 and cotter keys, however the latter are believed to provide somewhat more safety margin against inadvertent disengagement.

Seat support members 28, 30 and 32 are all supported by and securely attached to vehicle engagement panels 16. Seat support members are, as shown in the drawings, oriented in divergent directions relative to seats 12, such that there is no perceptible relative movement between seats 12 and support frame 14. The near "glove fit" between support frame 14 and the ATV vehicle (provided by the support and engagement scheme between the vehicle engagement panels 16 of support frame 14 and the ATV as described above), in turn, provides that there is substantially no movement of seats 12 which is not directly correspond to that of the moving vehicle itself. Seating module 10 is, as described during testing, "solid as a rock."

All portions of seating module 10 are, in the preferred embodiment of the invention, constructed of steel tubing of either round or square cross section, and (corresponding to the choice of seats 12 as described above) are preferably painted to precisely match the dominant paint scheme of the ATV itself.

As will be clear from the drawings, the stability of seating module 10, when installed in an ATV, will depend to some degree on insuring that module 10 correspond to the interior dimensions of the ATV bed B. For example, if bed B is X units of measure wide, Y units of measure in length, and the bed fence C is Z units of measure tall, then the respective outer surfaces of vehicle engagement panels 16 will be substantially X units apart, lower support frame rail 18 will be no longer than Y, and upper support frame rail 20 will not, when seating module 10 is installed in ATV A, rise any higher than Y (when seating module 10 is configured as depicted).

For safety, and even some degree of aesthetics, arm rest members 34 are provided at each lateral end of seating module 10. Additional arm rest member(s) could be added to an alternative embodiment (not shown in the drawings), if still additional hand-holds were desired. Furthermore, some consideration might be given to providing seat belts or other safety strap-like accessory, however the apparent safety of such an addition might be surpassed by the danger of a passenger being unable to be thrown safely from the vehicle, in the event of a roll-over. More study of these options would be appropriate before departing from the proposed design.

Another safety issue concerning the present invention also pertains to the potential for a roll-over. Clearly, the addition of passengers in the auxiliary seats of the seating module will have the effect of considerably raising the center of gravity of the combined vehicle and passengers, when compared to that when only two passengers ride in the front seats, and only low-lying cargo (or even people) reside in the bed. Therefore, proper use of embodiments of the present invention will take into consideration the center of gravity issue which, at a minimum, will dictate driving more slowly and on smoother ground than one might be willing to engage without the seating module installed and with passengers riding in the auxiliary seats. Some consideration should be given, particularly in the case of prospective passengers of notable weight (full-grown adults, for example), to avoid vehicle movement altogether when such passengers are in-place, using the additional seating solely as a stationary seating platform. In this regard, and others, common sense must enter the equation for responsible use of the present invention.

A seating module of the present invention provides benefits not seen before in the ATV accessory market. One can easily double the seating capacity of an ATV, in a manner which has the look and feel of original equipment, as if it were not even removable. Just as easily, the seating module can be removed for conventional use of the ATV's bed. The design of the support structure, with its specific vehicle engagement arrangement and seat support, provides stability which is indistinguishable from the original, front seats.

It should be understood that, while the present invention is directed to auxiliary seating units for ATVs, with particular reference to the GATOR ATV by John Deere, alternative embodiments are suitable, not just for other versions of bed-type ATVs, but larger embodiments are suitable for pickup trucks and other vehicles with analogous beds (for off-road use), and may involve more than two seats. In addition, it should be noted that, particularly for stationary outdoor seating (such as viewing a sporting event), one may reverse the orientation of seating module 12 to seat rearward relative to the vehicle A.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

We claim:

1. An auxiliary seating module for a vehicle with a bed, comprising:

a support frame having a first and second lateral end;

a first vehicle engagement panel at said first lateral end of said support frame, said first vehicle engagement panel having a first upper engagement panel rail and a first lower engagement panel rail;

a second vehicle engagement panel at said second lateral end of said support frame, said second vehicle engagement panel having a second upper engagement panel rail and a second lower engagement panel rail;

a seat support member attached to said first and second vehicle engagement panels;

a seat member attached to said seat support member; and a reversible attachment means for reversibly attaching said support frame to a bed fence of a vehicle, said reversible attachment means having attachment plates attached to said first and second upper engagement panel rails of said first and second vehicle engagement panels, said attachment plates having holes formed therein dimensioned to align with holes formed in a bed fence of a vehicle whereby securement pins may selectively pass, reversibly securing said seating module to a vehicle.

* * * * *